(12) United States Patent
Moore

(10) Patent No.: US 8,930,815 B2
(45) Date of Patent: Jan. 6, 2015

(54) METHODS, SYSTEMS AND COMPUTER READABLE MEDIA FOR CREATING A VIRTUAL AGENT

(75) Inventor: Darryl C. Moore, Conyers, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1513 days.

(21) Appl. No.: 11/936,436

(22) Filed: Nov. 7, 2007

(65) Prior Publication Data

US 2009/0119588 A1    May 7, 2009

(51) Int. Cl.
*G06F 3/048* (2013.01)
*G06Q 10/10* (2012.01)

(52) U.S. Cl.
CPC .................................. *G06Q 10/109* (2013.01)
USPC ........................................................ 715/706

(58) Field of Classification Search
USPC .................. 715/706, 744, 745, 747
See application file for complete search history.

(56) References Cited

U.S. PATENT DOCUMENTS

| | | | |
|---|---|---|---|
| 6,202,062 B1* | 3/2001 | Cameron et al. | 1/1 |
| 7,685,199 B2* | 3/2010 | Chandrasekar et al. | 707/748 |
| 2009/0158184 A1* | 6/2009 | Blattner et al. | 715/764 |

OTHER PUBLICATIONS

Kim, WO 01/84461.*

* cited by examiner

*Primary Examiner* — Thanh Vu
(74) *Attorney, Agent, or Firm* — Akerman LLP; Michael K. Dixon; Roy P. Zachariah

(57) ABSTRACT

Methods, systems, and products are disclosed for producing a virtual agent. The virtual agent is generated. A demographic trait of a user, interacting with the virtual agent, is acquired. The virtual agent is endowed with the demographic trait, thereby enriching the virtual agent to appeal the user. Further, one or more intelligent agents are associated with the virtual agent allowing the virtual agent to accomplish specific tasking as directed by the user.

20 Claims, 11 Drawing Sheets

METHODS, SYSTEMS AND COMPUTER READABLE MEDIA FOR CREATING A VIRTUAL AGENT

BACKGROUND

Exemplary embodiments generally relate to data processing and to virtual agents and, more particularly, to electronic shopping, research and to customization of operator interfaces.

Computer-generated agents, or "virtual" agents, are widely used to help computer users. Such agents are familiar to computer users, a common example being the paper clip office assistant found in Microsoft's WINDOWS XP® operating system. Currently, virtual agents provide a rudimentary user interface that may vocalize a menu selection using pre-recorded sound bites or provide pre-recorded instruction. In the case of Microsoft's paperclip help assistant, the paperclip merely presents an entertaining animation providing a bit of panache to what is a mundane search engine. Virtual agents can be improved.

SUMMARY

The exemplary embodiments provide methods, systems, and products for producing a virtual agent. A method, for example, generates the virtual agent within a personal computing device. The virtual agent is endowed with more than one characteristic trait. An intelligent agent is then created and associated with the virtual agent, associating the virtual agent with the intelligent agent, the intelligent agent periodically accomplishing a task and reporting a corresponding task result to a user via the virtual agent.

Exemplary embodiments include a computer readable medium for producing a virtual agent. The computer readable medium comprises instruction to accomplish acts that generates the virtual agent within a personal computing device and endows the virtual agent with at least one characteristic trait. The instruction then creates an intelligent agent and associates the intelligent agent with the virtual agent, the intelligent agent to accomplish a task outside the computing device for, and to report a task result to, a user via the virtual agent.

Exemplary embodiments include a system for implementing a virtual agent within a computing device. The system includes a means for creating a virtual agent, endowing the virtual agent with two or more personality traits and rendering the agent to a user via a user interface. The system also includes a means for communicating between the virtual agent and the user and further includes one or more databases wherein the computing device, the means for rendering and the one or more databases are in communication with each other via a network.

Other systems, methods, and/or computer program products according to the exemplary embodiments will be or become apparent to one with ordinary skill in the art upon review of the following drawings and detailed description. It is intended that all such additional systems, methods, and/or computer program products be included within this description, be within the scope of the claims, and be protected by the accompanying claims.

DETAILED DESCRIPTION

The exemplary embodiments will now be described more fully hereinafter with reference to the accompanying drawings where like reference numbers refer to like components. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Figure 1:
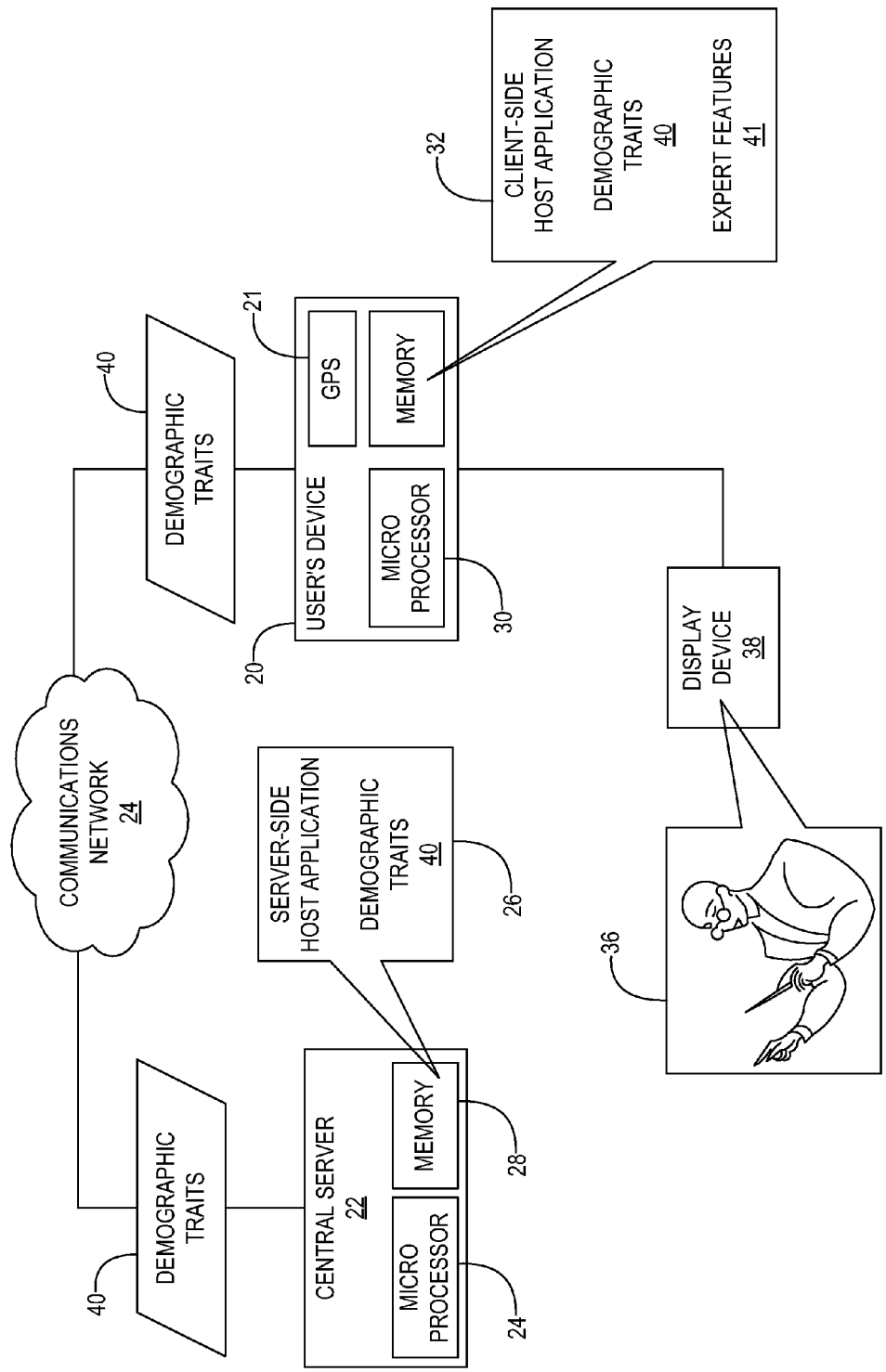
FIG. 1 is a schematic illustrating an operating environment in which exemplary embodiments may be implemented.

FIG. 1 is a schematic illustrating an environment in which exemplary embodiments may be implemented. A user's device 20 communicates with a central server 22 via a communications network 24. The user's device 20 may have a processor, application specific integrated circuit (ASIC), or other device 30 that executes a client-side agent application 32 stored in memory 34. Although the user's device 20 is generically shown, the device may be a computer, a radio, a personal digital assistant (PDA), a cordless/cellular/IP phone, a digital music player, or any other device. The server 22 may also have a processor, an application specific integrated circuit (ASIC) processor, or other device 24 that executes a server-side agent application 26 stored in a memory 28. A memory may be any type of device that may retain computer instructions. Non-limiting examples may be a computer processor, a magnetic disk, a video disk (a DVD, CD, etc), read-only memory ("ROM"), erasable programmable read only memory ("EPROM") random access memory ("RAM"), programmable memory (i.e. Programmable Logic Devices), Flash memory and any type of memory device to be developed in the future that may be preferred by a manufacturer to fill a particular requirement.

The user's device 20 and the server 22 are only simply illustrated. Because the architecture and operating principles of these devices are well known, their typical hardware and software components are not further shown and described.

The client-side agent application 32, or the server-side agent application 26 in conjunction with the client-side agent application, may cooperate to cause the user's device 20 to generate a virtual agent software object 36 (the "virtual agent"). The virtual agent 36 is illustrated as being visually produced on a display device 38. The virtual agent 36 may also have audible features, tactile features and may also have the functionality to both receive and output text. The virtual agent 36 may assume any persona including the user's own persona whose picture may be scanned to provide the necessary graphics. The virtual agent 36 may also assume the guise of an animal or an animated object, if so desired.

According to exemplary embodiments, the server-side agent application 26 and/or the client-side agent application 32 are sets of processor-executable instructions that create the virtual agent 36, operate the virtual agent and/or tailor the virtual agent to the user's desired persona. As the user interacts with the virtual agent 36, the server-side agent application 26 and/or the client-side agent application 32 may acquire one or more character traits 40 as may be associated with or chosen by the user. The character traits 40 may be demographic traits (e.g. southwestern drawl, socio-economic class, etc.) or may be personality or preference based traits (e.g. a sense of humor or choice of clothing). The character traits 40 may be based on actual data collected from the user's device 20. The character traits 40, however, may also be inferred with little or no data collected from the user's device 20. When the character traits 40 are obtained, the character traits 40 may be shared between the server-side agent application 26 and the client-side agent application 32. The server-side agent application 26 and/or the client-side agent application 32 may then cooperate to endow the virtual agent 36 with one, some, or all of the character traits 40 associated with the user. The virtual agent 36 is thus enriched with the character traits 40 that appeal to, and/or that match, the user. Some exemplary, non-limiting techniques for the collection and the inference of traits are more fully described in U.S. patent application Ser. No. 11/821,934.

At any time, the user may configure/re-configure the virtual agent 36. The user may prefer to override default settings and/or directly select the agent's characteristics. The user, for example, may access a menu of pre-defined agent characteristics. This menu may provide options for selecting or modifying the agent's physical appearance, personality, sense of humor, and any other traits. The user, for example, may select the agent's sex (male or female), ethnicity, hair color, eye color, and speech accent e.g., French or Midwestern). The user may select the agent's personality (e.g., helpful, aggressive, or nurturing). The user may also modify the agent's sense of humor. The user may be presented with levels of humor, and the user may choose the level that best suits the user. A "0" level, for example, may endow the virtual agent 36 with a dry sense of humor, while level "10" endows the agent with a joking sense of humor (corporate users, as an example, may prefer that the agent be endowed with company-appropriate humor). The user may select the agent's clothing, hair style and jewelry, even selecting famous or niche designers' offerings. The user may select attributes that include a cane, walker, wheelchair, crutches, sign language abilities, and other personalizing characteristics. The user may even select or create a non-human caricature accompanied by a menu of genre appropriate features. The user, in short, may be presented with a full menu of virtual agent 36 characteristics, thus enabling the user to configure the virtual agent as desired. The longer the user interacts with the virtual agent 36, the more character traits 40 may be acquired. The virtual agent 36 may thus continually evolve to "mirror" the user's personality and/or "remember" the user's past activity if the user so desires. For example, the agent may automatically "age" along with the user.

Some aspects of computer-generated or virtual agents are known, so this disclosure will not greatly explain the known details. If the reader desires more details, the reader is invited to consult the following sources: U.S. Pat. No. 5,309,355 to Lockwood; U.S. Pat. No. 6,032,129 to Greef, et al.; U.S. Pat. No. 6,035,283 to Rofrano; U.S. Pat. No. 6,088,731 to Kiraly, et al.; U.S. Pat. No. 6,735,632 to Kiraly, et al.; U.S. Pat. No. 6,868,392 to Ogasawara; U.S. Pat. No. 6,904,408 to McCarthy, et al.; U.S. Pat. No. 7,184,540 to Dezonno, et al.; U.S. Patent Application Publication 2001/0032140 to Hoffman; and U.S. Patent Application Publication 2003/0028498 to Hayes-Roth.

Exemplary embodiments may be applied regardless of networking environment. The communications network 24 may be a cable network operating in the radio-frequency domain and/or the Internet Protocol (IP) domain. The communications network 24 may also include a distributed computing network, such as the Internet, an intranet, a local-area network (LAN), and/or a wide-area network (WAN). The communications network 24 may include coaxial cables, copper wires, fiber optic lines, and/or hybrid-coaxial lines. The communications network 24 may even include wireless portions utilizing any portion of the electromagnetic spectrum and any signaling standard (such as the I.E.E.E. 802 family of standards, GSM/CDMA/TDMA or any cellular standard, and/or the ISM band). The communications network 24 may even include power line portions, in which signals are communicated via electrical wiring. The concepts described herein may be applied to any wireless/wireline communications network, regardless of physical componentry, physical configuration, or communications standard(s).

The virtual agent 36 may be associated with a particular device or be associated with a particular user thereby appearing on a number of devices accessed by the user. The virtual agent may also be accessed on multiple devices simultaneously (e.g. such as on a home computer and on a cell phone) via the communications network 24. The virtual agent 36 may have a different appearance on each of the different user devices based in characteristic traits 40 selected/stored at each of the devices.

Figure 2:
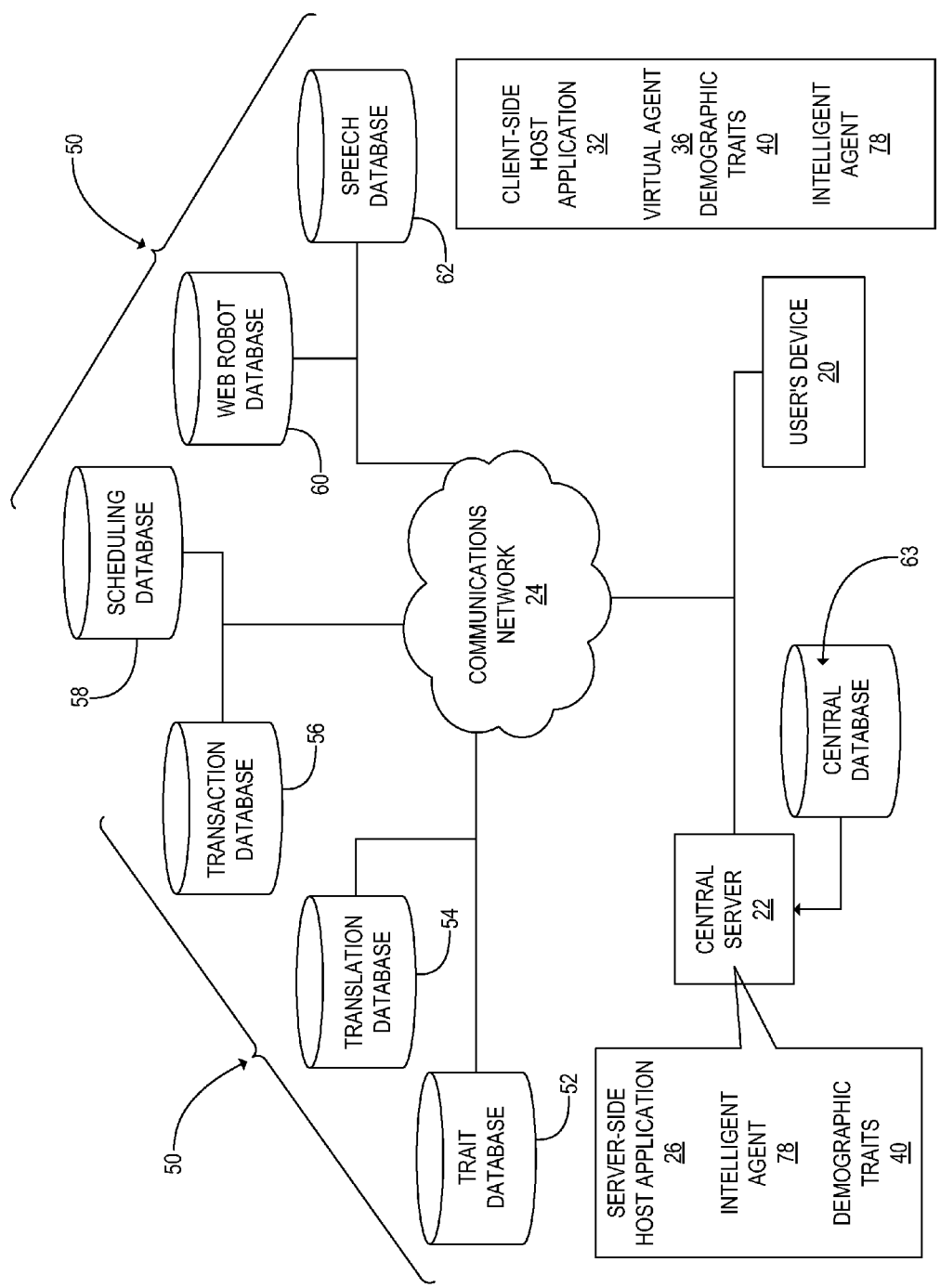
FIG. 2 is a schematic illustrating another environment in which exemplary embodiments may be implemented.

FIG. 2 is a schematic illustrating another environment in which exemplary embodiments may be implemented. Here, the user's device 20, and/or the central server 22, may access one or more databases 50 to acquire, obtain, or even infer the demographic traits 40. That is, the server-side agent application 26 and/or the client-side agent application 32 may query any of the databases 50 for information that helps configure or operate the virtual agent 36 for the user. The various databases 50 are illustrated, as a non-limiting example, as being remotely located from both the user's device 20 and from the server 22. That is, the user's device 20 and/or the server 22 may query the databases 50 via the communications network 24 to obtain information. Any of the various databases 50, however, may be locally stored in the user's device 20 and/or in the server 22. Further, any or all of the databases 50 may be combined into one database or any combination thereof. The number of databases and the types of information presented herein are meant to be illustrative only and are in no way intended to limit or constrain the subject matter being described. Additional databases and/or types of information may be created to support the rendering and the operation of the virtual agent 36, to satisfy a particular customer or a manufacturer's need. Each database will be briefly introduced and then more fully described thereafter, in turn.

Exemplary databases that may be considered to be useful in maintaining a virtual agent 36 include the following. A trait database 52 may store a variety of potential character traits 40 and the relationships between the character traits 40 and the virtual agent(s) 36 that has assumed those traits. It is common for a single computer to support a number of discrete users. As such, each user may create their own virtual agent 36 resulting in the trait database 52 supporting multiple virtual agents. Conversely, a user may have selected a different set of character traits 40 to be displayed by the virtual agent 36 for each computing device associated with the user although there may be only single virtual agent 36.

Exemplary databases may include a translation database 54, a transaction database 56 and a scheduling database 58. The translation database 54 may provide translation services between Internet Protocol addresses, physical addresses, telephone numbers, email addresses, and/or any other communications addresses. The transaction database 56 may store web transactional data, while a scheduling database 58 stores calendar, scheduling and geographical location records. The translation database 54, transaction database 56 and the calendar database 58 may be accessed by the virtual agent 36 or an intelligent agent 78 for information in order to complete a particular task for the user.

The exemplary databases may include a web robot database 60. The web robot database 60 may store information necessary to create, track and control one or more web robots or search engines 200 (See FIG. 6) created by the user to accomplish a particular task. Web robots and search engines may be created and controlled by an intelligent agent 78. Intelligent agents 78 will be more fully described, below.

A central office database 63 may also be included. The central office database 63 may store information describing the network 24 for use by either the intelligent agent 78 or the virtual agent 36. Further, a speech database 62 may store accents and/or dialects that may be applied to the virtual agent 36 as well providing interactive voice communication services and text-to-voice/voice-to-text translation. As the following paragraphs explain, the server-side agent application 26 and/or the client-side agent application 32 may query any of the databases 50 for information that helps tailor the persona or to operate the virtual agent 36, intelligent agent 78 and/or web robot 200 according to the user's preferences.

Figure 3:
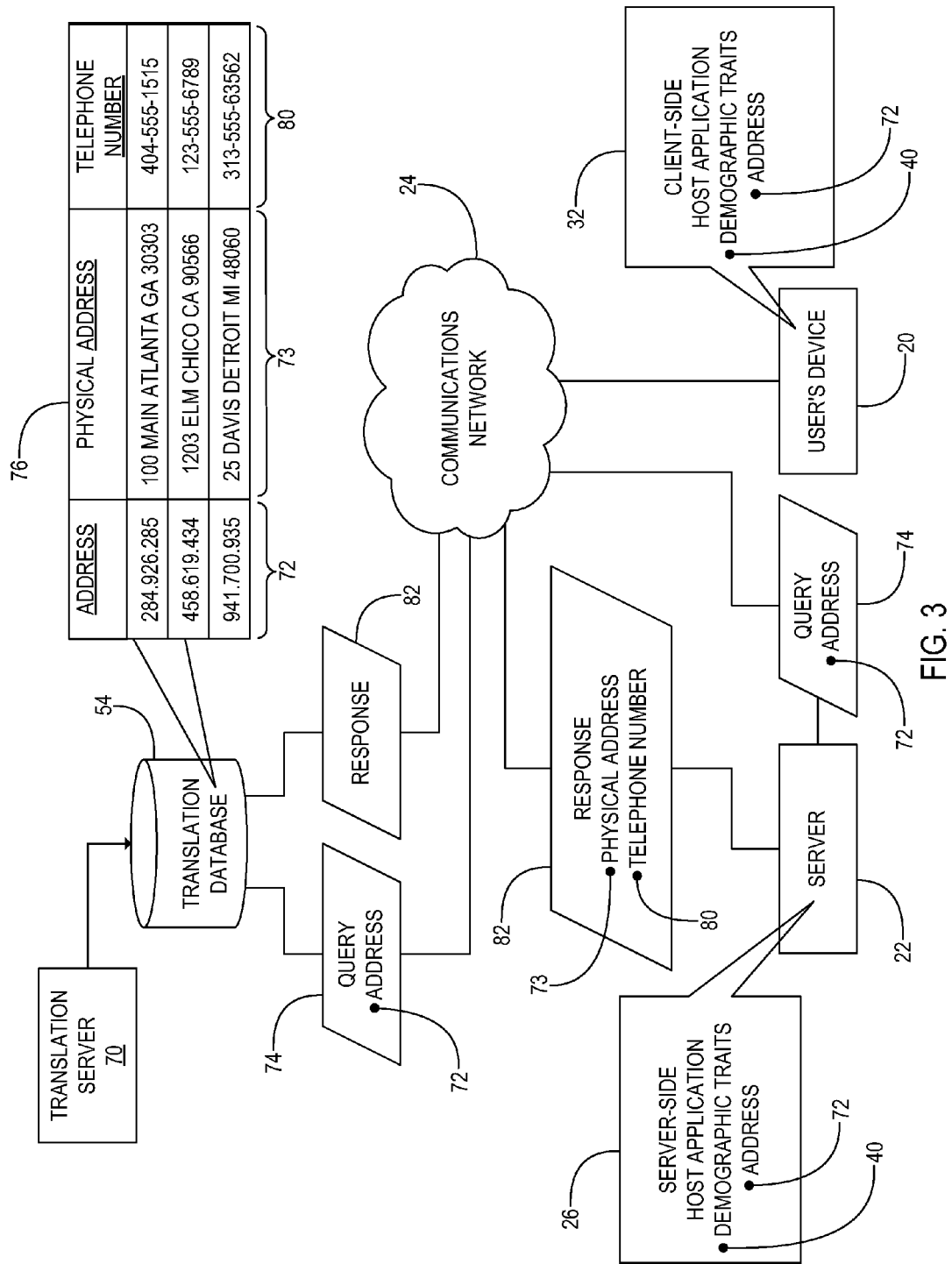
FIG. 3 is a schematic illustrating a translation database, according to exemplary embodiments.

FIG. 3 is a schematic illustrating the translation database 54, according to exemplary embodiments. The translation database 54 provides translation services between Internet Protocol addresses, physical addresses, telephone numbers, email addresses, and/or any other communications addresses, according to exemplary embodiments. The translation database 54 allows the translation of network addresses which may be garnered by an intelligent agent 78 during a task to physical world contact information which may be relayed to the user by the virtual agent 36 in verbal and/or text form.

In FIG. 3, the translation database 54 is illustrated as being remotely stored in a translation server 70, yet the translation database 54 may be locally stored in the user's device 20 and/or in the server 22. As the server-side agent application 26 and/or the client-side agent application 32 interact with the intelligent agent 78, either application may obtain an IP address 72 associated with the user's device 20, the geographic position of the user's device or an IP address related to a web site visited by a web robot 200. The address 72, as a non-limiting example, may be a static or dynamic Internet Protocol address assigned to the user's device 20. The address 72, however, may also be an email address, pager address or any other communications address. The translation database 54 may then be queried for the address 72 and vice versa. FIG. 3, for simplicity, illustrates a query 74 being communicated from the server 22 to the translation database 54. The query 74, however, may additionally or alternatively be communicated from the user's device 20. The query 74 may include information representing the address 72.

The translation database 54 may translate the address 72. As a non-limiting example, the translation database 54 is further illustrated as a table 76 that maps, relates, or otherwise associates the IP address 72 to a physical address 73 and/or to a telephone number 80. Translation database 54 may contain other or different information than depicted herein.

In response to the query 74, the translation database 54 may send a query response 82, and the query response 82 may include the telephone number 80 and/or the physical address 73 associated with the web address 72. Suppose, for example, that the translation database 54 is queried for an Internet Protocol address assigned to the user's device 20. The translation database 54 may then retrieve and return the physical address 73 associated with the address 72. The physical address 73, for example, may be a postal mailing address or Global Positioning System ("GPS") 22 coordinates that finely or accurately describe a physical location associated with the address 72 and perhaps with the user. (See FIG. 1). The physical address 73, however, may be a more general description of location, such as a United States Postal Service "Zone Improvement Plan" (or "ZIP") code. Other more general descriptions of location may include a city or metropolitan area, county, state, or even region. The translation database 54, in general, stores any information that may be associated with the address 72.

Figure 4:
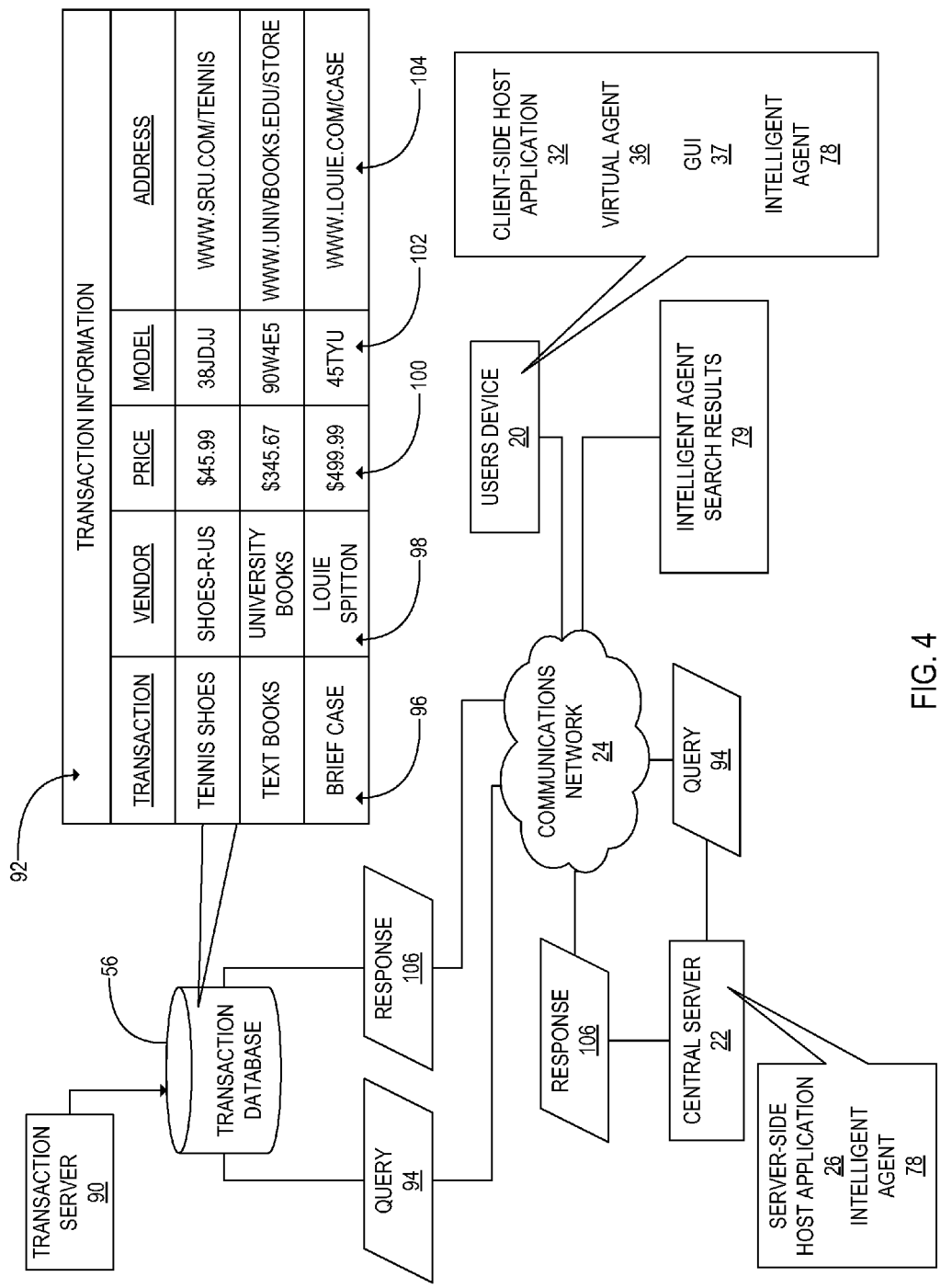
FIG. 4 is a schematic illustrating a transaction database, according to exemplary embodiments.

FIG. 4 is a schematic illustrating the transaction database 56, according to exemplary embodiments. The transaction database 56 is the repository for network transactional data created during transactions carried out by the user directly and/or via virtual agent 36 and intelligent agent 78. The transaction database 56 may be accessed by the virtual agent 36 and/or intelligent agent 78 for data needed in carrying out a task or as a step in reporting a task result to a user.

The transaction database 56 is illustrated as being remotely stored in a transaction server 90, yet the transaction database 56 may be locally stored in the user's device 20 and/or in the server 22. According to exemplary embodiments, the transaction database 56 stores transaction information 92 that may or may not be derived from commercial or other websites. The transaction database 56 may acquire data concerning a user's past network transactions 79, current network transactions or even future network transactions, where future transactions may include information concerning prospective transactions such as comparative shopping information or price checks. A transaction may be any kind of transaction that may be executed by a computing device over a network or within the computing device. Exemplary, non-limiting types of transactions may include purchases, sales, financial transactions, research downloads, news story downloads, web searches, movie trailer downloads and the like. Although the central server 22 is depicted as sending the query 94 and receiving the response 106, either the central server 22 or the client device 20 or both may communicate a query 94 to the transaction database 56 and receive a response 106.

A transaction may be one carried out manually by the user or may be one carried out by an intelligent agent 78. The Intelligent agent 78 may control the web robot 200 (See FIG. 6) also commonly referred to as a "Bot". The Bot 200 is a software program or object that has the capability to automatically scan the Internet on a one time, a periodic, a continuous or a real-time basis for information that may be desired by a user. The Bot 200 may exhibit aspects of intelligence in carrying out its task and may act independently of its user or creator.

A full discussion concerning the myriad types of Bots 200 is beyond the scope of this disclosure. However, internet search tools utilize some type of Bot 200. Bot 200 technology exists in a spectrum in terms of sophistication. Non-limiting exemplary types of Bots 200 may be as simple as traditional web crawlers or as sophisticated as the latest site-scrapping Bots that enter into a web site to harvest particular information from the web site. Bots 200 may be weak agents that exhibit basic capabilities such as mere autonomy and communication with other Bots. Bots 200 may be strong agents that include more humanistic characteristics (i.e. executing transactions). Bots 200 may be stationary to a particular machine or may be mobile, moving from machine to machine and then returning to its creator's machine. Bots 200 may execute binding contracts for its creator with or without the creator's knowledge based upon the creator's express, implied authority or inherent authority. Bots 200 may be able to spend money or virtual money. The Bots 200 contemplated by the disclosure herein may be any type of existing Bot 200 or any type of Bot that may be developed in the future.

The transaction database 56 may store information obtained by the Bot 200, from a transaction completed by the user or that is otherwise obtained from an outside source. Table 92 is a simplified example of the transaction database 56. Once the transaction is completed (e.g. a purchase of tennis shoes), the server-side agent application 26 and/or the client-side agent application 32 may then query the transaction database 56 for information about the transaction 79. FIG. 4, for simplicity, illustrates a query 94 being communicated from the server 22 to the transaction database 56 although such a query/response may be made to the user device 20.

The query 94 may include information representing any of the transactions or searches carried out by the Bot 200 or directly by the user (e.g. filling a web site shopping cart). The transaction database 56 maps, relates, or otherwise associates the information in the query 94 to the desired transaction database information 92. The transaction server 90 may record, looks up and retrieve the transaction information 92. Such information may include the user's credit card/credit card number used, item purchased, catalog number, the date/time or purchase, the seller IP address, Seller phone number, the warrantee, citation information, etc.

Once collected, the transaction information 92 may describe the transaction associated with the transaction item 96. When the server-side agent application 26 and/or the client-side agent application 32 queries for information concerning the transaction 96, the transaction database 56 retrieves the transaction information 92 associated with the transaction 96. The transaction information 92, for example, may describe the vendor 98, the price 100, what merchandise was purchased 102 and from what web site web page was the transaction item offered 104. According to exemplary embodiments, the transaction database 56 may then send a query response 106 which may include the transaction information 92. The query response 106 may be communicated to the server 22, the client device 20 or to both. The server-side agent application 26 receives the query response 106. The server-side agent application 26 and the client-side agent application 32 may then cooperate to present the information 92 to the user via the virtual agent 36 and or the GUI 37.

Figure 5:
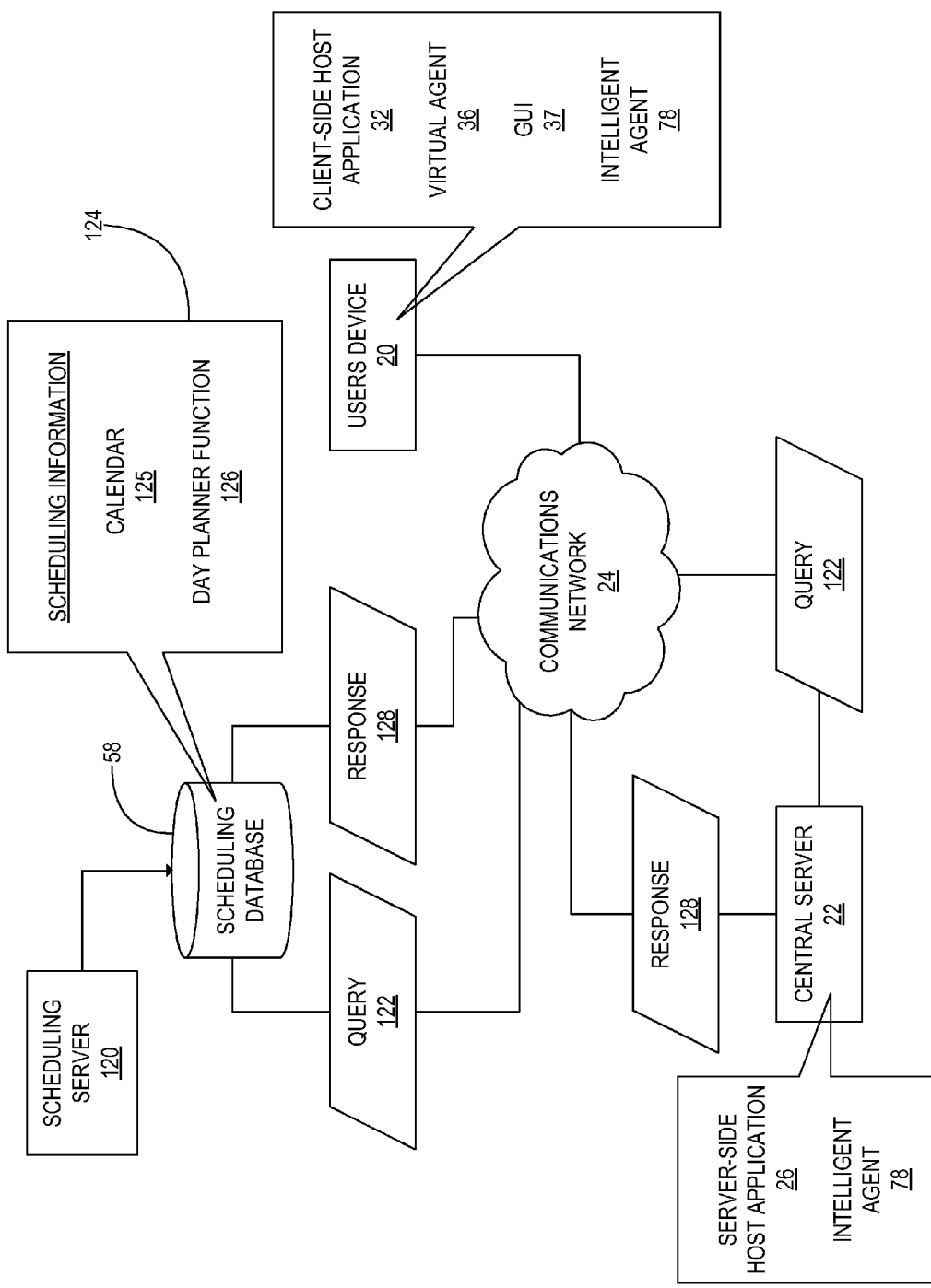
FIG. 5 is a schematic illustrating a scheduling database, according to exemplary embodiments.

FIG. 5 is a drawing illustrating the scheduling database 58, according to more exemplary embodiments. The scheduling database 58 may be accessed by both the intelligent agent 78, the virtual agent 36 in carrying out their respective functions. The user may access the scheduling database 58 directly as well through a graphical user interface. The scheduling database 58 is illustrated as being remotely stored in a scheduling server 120, yet the scheduling server 120 and scheduling database 58 may be locally stored in the user's device 20 and/or in the server 22. The scheduling database 52 stores calendar, day-planning and other scheduling data 124, according to exemplary embodiments. The scheduling database 58 may map, relate, or otherwise associate calendar data 125 and day planning data 126 to the transactions described above in regards to FIG. 4 or to facilitate any function of the virtual agent 36 or an intelligent agent 78.

According to other embodiments the scheduling data base 58 may be a coordinated combination of other databases and functions that may independently exist within the user's device 20 or central server 22. For example, scheduling server 120 may be a software object that coordinates the pre-existing calendar and clock applications (i.e. Microsoft OUTLOOK®) that may be integrated into the operating system (not shown) of the user device 20 or that may be stand alone applications.

As a non-limiting example, central server 22 may initiate a query 122 for scheduling information concerning a task assigned to a Bot 200 by the intelligent agent 78 that controls the Bot. The task may be to buy a particular model watch for a birthday gift for a birthday on June 6. Query 122 is transmitted through communications network 24 to scheduling server 120 which obtains the date and time that the user had established as the deadline for the completion of the task. The response 128 with the information, (i.e. June 5) is returned to the server side application 26. The query 122 may also direct that the response 128 also be sent to the client side application 32 resident in the user's device 20 for rendering to the user by virtual agent. It should be noted that the virtual agent 36 could just as easily have initiated the query 122 as the result of a direct user inquiry to the virtual agent 36.

Figure 6:
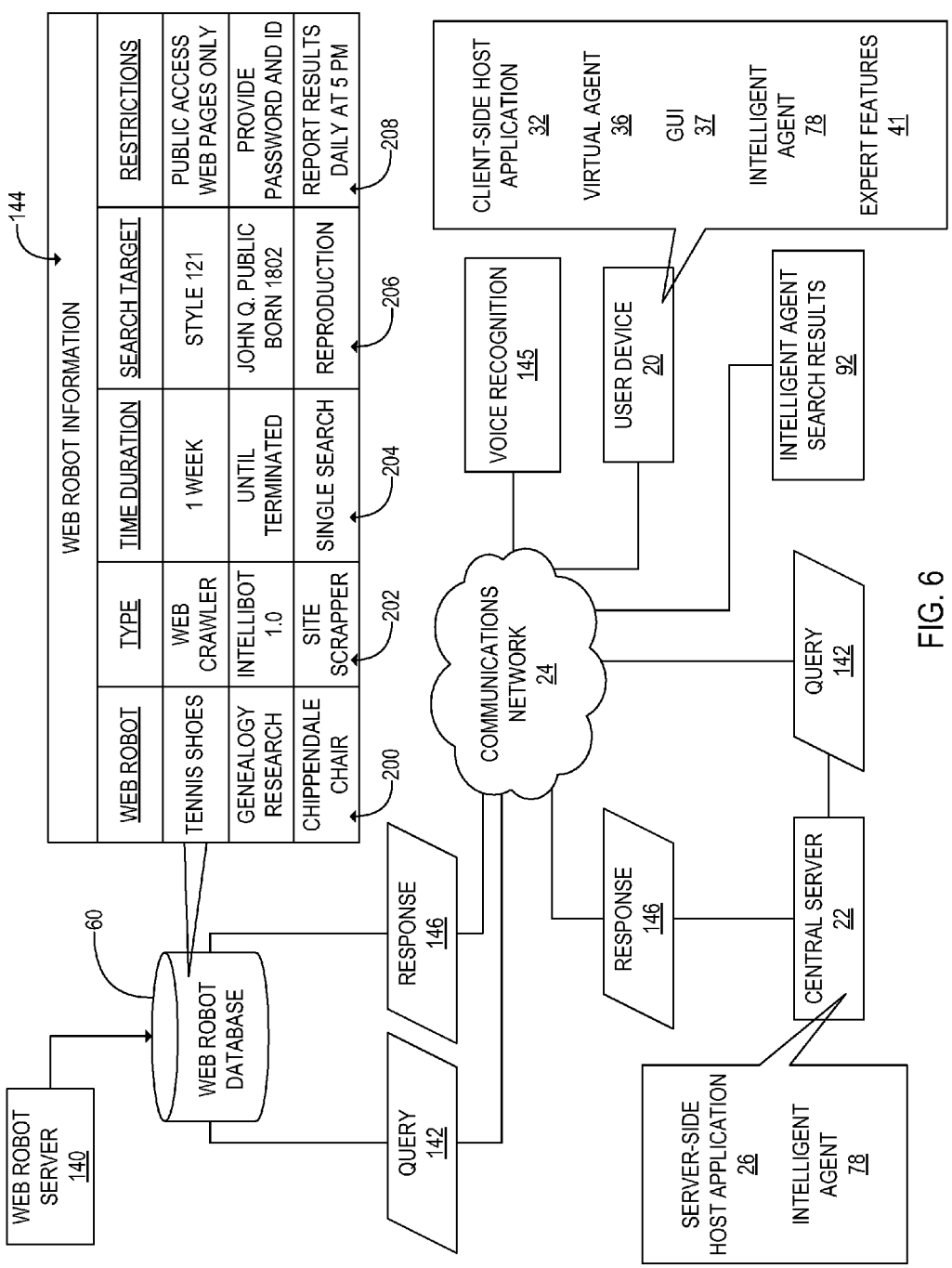
FIG. 6 is a schematic illustrating a web robot database, according to exemplary embodiments.

FIG. 6 is a schematic illustrating the web robot or "Bot" database 60, according to more exemplary embodiments. The web robot database 60 contains the data necessary to operate a web robot 200. The web robot database 60 is illustrated as being remotely stored in a web robot server 140, yet the web robot server 140 and database 60 may be locally stored in the user's device 20 and/or in the server 22. As mentioned above, the Bot 200 may be an intelligent agent 78 used to accomplish a computerized task for a user on an autonomous or semiautonomous basis. Bots 200 are contemplated herein to cover a range of software objects that my range from a simple web crawler to a sophisticated site scraping Bot. The user may control and/or monitor one or more Bots 200 (i.e. intelligent agents) on a continual basis through the client-side host application 32. The Bot database 60 stores information required to create, track, monitor and control every Bot 200 created and/or dispatched by the user via the intelligent agent 78. Any information retrieved by a Bot 200 may be transferred to and stored in the transaction database 56 and/or in user device 20.

The user may create and interact with the Bot 200 via the virtual agent 36 and intelligent agent 78. The virtual agent 36 may use a GUI 37 or an interactive voice recognition module (VRM) 145 to communicate with the user. The VRM may be a two way text-to-voice translator, such that the user may converse verbally with the virtual agent 36 via the user device 20, and the virtual agent can then communicate with the various components, discussed above, in computer executable code and or executable text. The VRM 145, or some componentry thereof, may reside in the user device 20, the central server 22 or elsewhere in the network 24. The VRM 145 componentry may also be dispersed between a combination thereof as a manufacturer or systems designer may find to be useful. Various VRMs 145 and their uses are well known in the art and will not be discussed in detail herein. The VRM 145 may be used to create the voice of the virtual agent 36 and to communicate with the virtual agent 36 alone or in combination with the GRU 37.

The VRM 145 may be used to query any of the servers described herein as may be desired by a manufacturer. For example, the intelligent agent 36 may receive the user's voice input via VRM 145 making a data request. The data request may require direct communication between the client-side application 32 and the transaction server 56.

Similarly, the VRM 145 may receive the user voice input at the user device 20 requiring translation of the input to computer executable code. The computer executable code, in turn, may be communicated to and executed by the Bot Server 140 to create and/or control one of more Bots 200. Alternatively, or in combination, the GUI 37 may also be used by the user to communicate with any of the databases (52-63) and or servers (22,70, 90 120, 140, 220).

Creating a Bot 200 may be as simple as initiating a web search as are commonly done by web search engines. Some of the more ubiquitous search engines are services provided by Yahoo, Inc. and Google, Inc. Search hits and/or task results hits returned by a Bot 200 may be prioritized in any number of ways that may be known in the art. Non-limiting examples may include relevancy, alphabetical order, date of creation, search term logic, geography or subject matter. More sophisticated Bots 200 may also be created as would be well known in the art (e.g. site scrapping Bots) and found useful by a system designer. The information retrieved by the Bots 200 may be parsed, organized and stored for later retrieval in transaction database 56, any other database or any combination of data bases as may prove to be useful.

The GUI 37 and/or VRM 145 may allow the User to control basic Bot 200 features through the intelligent agent 78 and also allow the user access advanced or "expert" Bot control features 41 as well. A simple Bot 200, with basic features such as those of a simple web crawler, may be executed and controlled directly from the User's device 20 or remotely from the central server 22 via a web browser. Sophisticated Bot 200 software may be more efficiently controlled by the intelligent agent 78, and may reside elsewhere, such as on the central server 22. Since some Bots 200 may run continually over a prolonged period, those Bots may require a host system that also operates continually. The GUI 37 and/or VRM 145 may allow user access to any Bots 200, via intelligent agent 78 that may actually reside on the central server 22 over communications network 24. Although resident on the central server 22, it would appear to the user as if they are resident on the user's device 20.

Data concerning the creation and control of a Bot 200 may be stored in the web robot database 60. A non-limiting, exemplary data schema 144 included in the web robot database 60 is depicted herein. Data schema 144 is a simple table but may be any type of database storage scheme that may be known in the art. Information that may be stored in database 60 may include each Bot 200. As a non-limiting example the Bot 200 may be described with the name of a product being researched such as "tennis shoes" but could be any data string identifying the Bot. The schema my also include the type of Bot 200 being employed 202 for the task and may also included the search duration 204. Depending on the type of Bot 200 and the preference of the user, the intelligent agent 78 may execute a web search that takes seconds and then terminates after presenting its results. On the other hand the Bot 200 may operate continually and/or periodically for a prolonged period of time, even indefinitely. Search results may be returned to the user periodically.

Other exemplary information contained within the data schema 144 may include a description of the target of the search 206 and any search restrictions 208 that the user may choose to impose. The restrictions may concern the subject matter being searched for or may limit the capability or limit the operations of the Bot 200. For example, such restrictions may include "purchase when located", "search public access pages only" or, "retrieve web pages". A discussion concerning the specific software making up the myriad types of web robots 200 is beyond the scope of this disclosure. However, the intelligent agent 78 may interface with a variety of web robot software objects to dispatch, control and receive the results of each web robot that has been created. Any such techniques as are known in the art currently or in the future may be utilized as required by a manufacturer.

Figure 7:
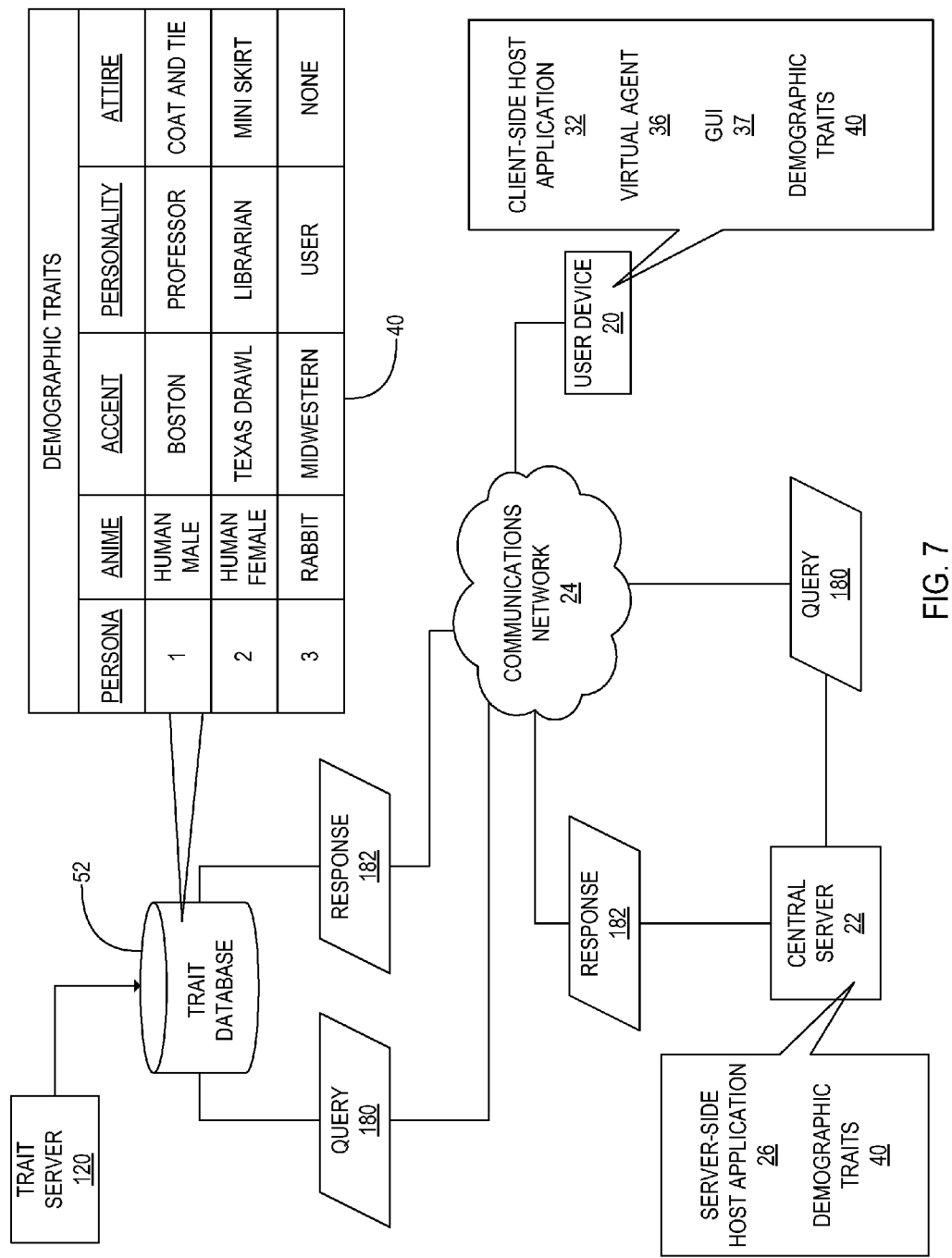
FIG. 7 is a schematic illustrating a trait database, according to exemplary embodiments.

As FIG. 7 illustrates, the virtual agent 36 may be endowed with the character traits 40 chosen by the user. The trait database 52 may store clothing styles, hair color, jewelry, and eyewear parameters for the virtual agent 36. The trait database 52 may even store mannerisms, attitude, and other personality characteristics that are desirable for a chosen demographic level. The trait database 52 may further store scripts, questions, and even vocabularies that are demographically matched to a chosen trait. The trait database 52 may thus be used to obtain parameters or data objects that endow the virtual agent 36 with characteristics that demographically match, resemble, or appeal to the user. Traits may be retrieved via a trait query 180 and a subsequent response 182. Although not shown in order to maintain simplicity in the drawings, the user device may make the same or similar queries 180 and receive the same or similar responses 182 as the central server. The method of retrieval depends on the technical capacity of the user device 20, the network and the needs of the system designer.

A subset of the character traits 40 stored in the trait database 52 may also reside in either the central server 22 or may reside in the user device 20 as a chosen set of traits or as a subset of popular traits that may be selected thereby facilitating access by either the central server 22 or the user device 20. Further, a fully configured persona data set may reside on any of the trait server 120, the central server 22 or the user device 20 as may be considered convenient or efficient by a system designer. Furthermore, a subset of the required or chosen trait information 40 may be pre-positioned on the user device 20 with the balance of the required trait information being communicated from the trait server 120 or central server 22 as may be convenient for a particular application.

The user may select a variety of traits using client device 20 either using the VRM 145 or via the GUI 37. The selection may transit server-side application 26 which may query 180 the trait database 52 and then receive the response 182 including the character traits 40 that are chosen by the user. The virtual agent 36 may then assume the traits chosen by the user by incorporating those character traits 40 into the server side application 26. The central server 22 may then render the virtual agent 36 to the user on user device 20 or may preposition some data objects to the client device 20 to be utilized by the client side application in rendering the virtual agent 36. Alternatively, the client device 20 may query the database directly and receive the trait data objects 40. In that case the virtual agent 36 may be completely resident within the user device 20 or may communicate trait data objects to the central server 22 from which they may be drawn when required by the client application 32. Where the components of the virtual agent 36 and its traits actually reside is a matter of convenience and efficiency depending on system capabilities and the needs of the designer.

The character traits 40 may also be acquired by inference. Creating a persona with traits acquired by inference is beyond the scope of this disclosure, however, details of such are disclosed in co-owned, co-pending U.S. patent application Ser. No. 11/821,934.

Figure 8:
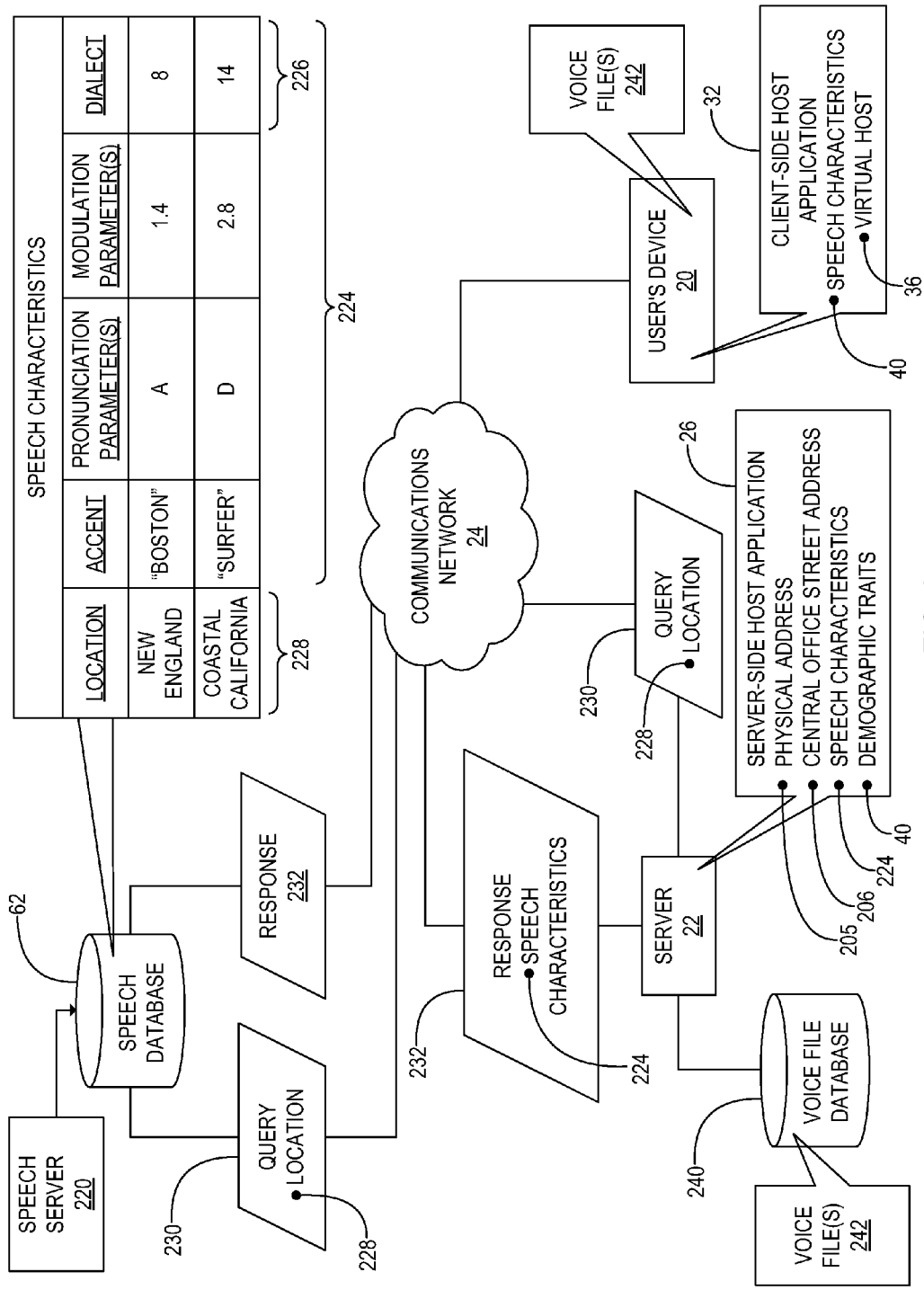
FIG. 8 is a schematic illustrating a speech database, according to exemplary embodiments.

The trait database may operate in conjunction with, or also include, a speech database 62 in operational support of the VRM 145. FIG. 8 is a schematic illustrating the speech database 62, according to exemplary embodiments. The speech database 62 may be used to develop speech characteristics that demographically match, resemble, or appeal to the user. The speech database 62 is illustrated as being remotely stored in a speech server 220, yet the speech database 62 may be locally stored in the user's device 20 and/or in the server 22. The speech database 62 stores speech characteristics 224, such as accents, pronunciations, modulations, tones, pitches, and/or other vocal characteristics. The speech database 62 may even store one or more sets 226 of dialects. As the below paragraphs explain, exemplary embodiments may allow the user to select the appropriate speech characteristics 224 and/or dialect 226 and may then endow the virtual agent 36.

The speech characteristics 224 may be selected based on a location 228. As the above paragraphs explained, exemplary embodiments may obtain the geographic location associated with the user. Exemplary embodiments, however, may also obtain the street address 206 of the serving central office. Whether the user's location 228 is obtained or inferred, the speech characteristics 224 may be chosen based on the location 228. When, for example, the user (at the user's device 20) is associated with the State of Massachusetts, exemplary embodiments may apply a "New England" or a "Boston" accent. When the location 228 is the southeastern United States, the virtual agent 36 may be endowed with a "Southern" accent. The virtual agent 36 may be endowed with a "surfer dude" accent or dialect when the location 228 indicates Huntington Beach, Calif. Exemplary embodiments, then, may use location to endow the virtual agent 36 with the speech characteristics 224 that are shared or identified by regional location.

The server-side agent application 26 (and/or the client-side agent application 32) may send a query 230 to the speech database 62. The query 230 includes information representing the location 228 (e.g., the geographic location 80 and/or the central office street address 206). The speech database 62 performs a lookup and retrieves one or more of the speech characteristics 224 that are associated with the location 228. The speech database 62 then sends a query response 232, and the query response 232 includes information representing the speech characteristics 224. When the server-side agent application 26 receives the query response 232, the server-side agent application 26 (and/or the client-side agent application 32) may then endow the virtual agent 36 with the selected speech characteristics 224.

The speech database 62, for example, may return a filename. This filename may represent a voice file to be applied to the virtual agent 36. The server-side agent application 26, for example, may access a voice file database 240. The voice file database 240 is illustrated as being locally stored in the server 22, yet some or the entire voice file database 240 may be stored in the user's device 20. The voice file database 240 may even be remotely accessed via the communications network 24. The voice file database 240 stores multiple voice files 242, any of which may be applied to the virtual agent 36. Each voice file 242, for example, may comprise accents, pronunciations, modulations, tones, pitches, and/or other vocal characteristics. Each voice file 242 may comprise one or more phonemes. Each voice file 242 may comprise recordings of actual or synthetic speech generated by VRM 145 that may be audibly produced on behalf of the virtual agent 36. Whatever each voice file 242 includes, each voice file 242 may endow the virtual agent 36 with different speech characteristics. One voice file, for example, may cause the virtual agent 36 to have audible content in the "Boston" accent. A different voice file may endow the virtual agent 36 with the "Southern" accent, while another voice file produces "surfer dude" speech.

As the above paragraphs explained, when the server-side agent application 26 and/or the client-side agent application 32 interact with the user's device 20, either or both server side applications 26 and client side application 32 may obtain the geographic location of the user's device 20. The location may be determined by any available means. Such means my include a global positioning system 21, radio triangulation and transceiver proximity techniques. The user's geographical position may be used as a task input to an activated Bot 78 to improve the Bot's search efficiency.

As a simple non-limiting example incorporating a GPS 21 input, the user may enjoy That food. As he travels he may have created a Bot 200 programmed to always find a good nearby That restaurant. As the user travels, the user's geographic location may periodically change the Bot's 200 programming causing it to retrieve web data relevant to finding a That restaurant at the new geographic location. It should also be noted that the transaction database 56 may also be searched to retrieve any data that may have been previously obtained concerning past transactions at That restaurants.

It should be noted that through out the description, the various queries (74, 94, 122, 142, 180, 288) and various responses (82, 106, 128, 146, 182 and 232) are depicted as specific queries and responses to and from specific databases for the sake of simplicity. However, the queries and responses may be combined into a single query/response or fewer multiple queries/responses as may prove convenient and efficient given any particular system structure.

Figure 9:
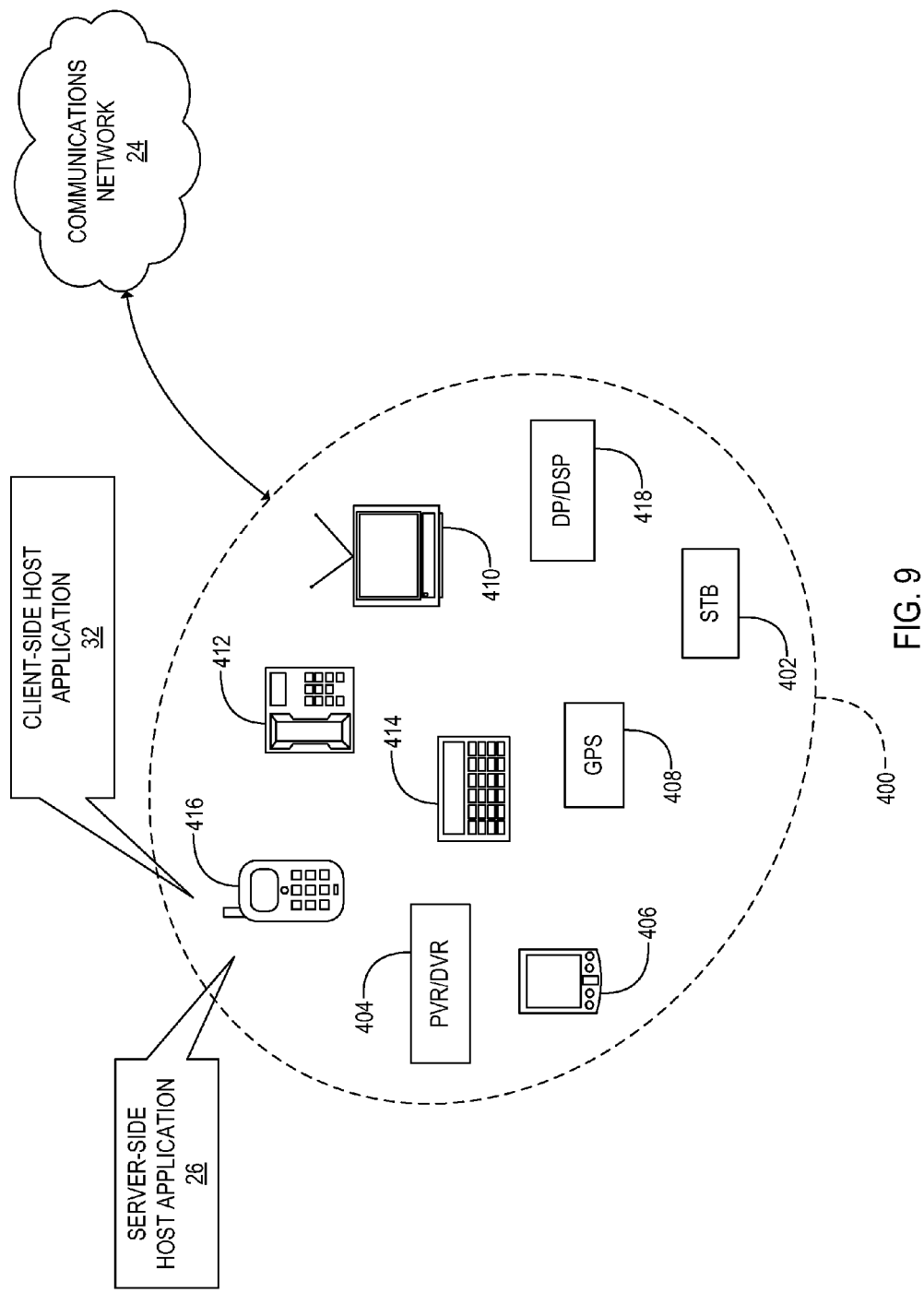
FIG. 9 depicts other possible operating environments for additional aspects of the exemplary embodiments.

FIG. 9 depicts other possible operating environments for additional aspects of the exemplary embodiments. FIG. 9 illustrates that the server-side agent application 26 and/or the client-side agent application 32 may alternatively or additionally operate within various other devices 400. FIG. 9, for example, illustrates that the server-side agent application 26 and/or the client-side agent application 32 may entirely or partially operate within a set-top box (402), a personal/digital video recorder (PVR/DVR) 404, personal digital assistant (PDA) 406, a Global Positioning System (GPS) device 408, an interactive television 410, an Internet Protocol (IP) phone 412, a pager 414, a cellular/satellite phone 416, or any computer system and/or communications device utilizing a digital processor and/or a digital signal processor (DP/DSP) 418. The device 400 may also include watches, radios, vehicle electronics, clocks, printers, gateways, mobile/implantable medical devices, and other apparatuses and systems. Because the architecture and operating principles of the various devices 400 are well known, the hardware and software componentry of the various devices 400 are not further shown and described.

Figure 10:
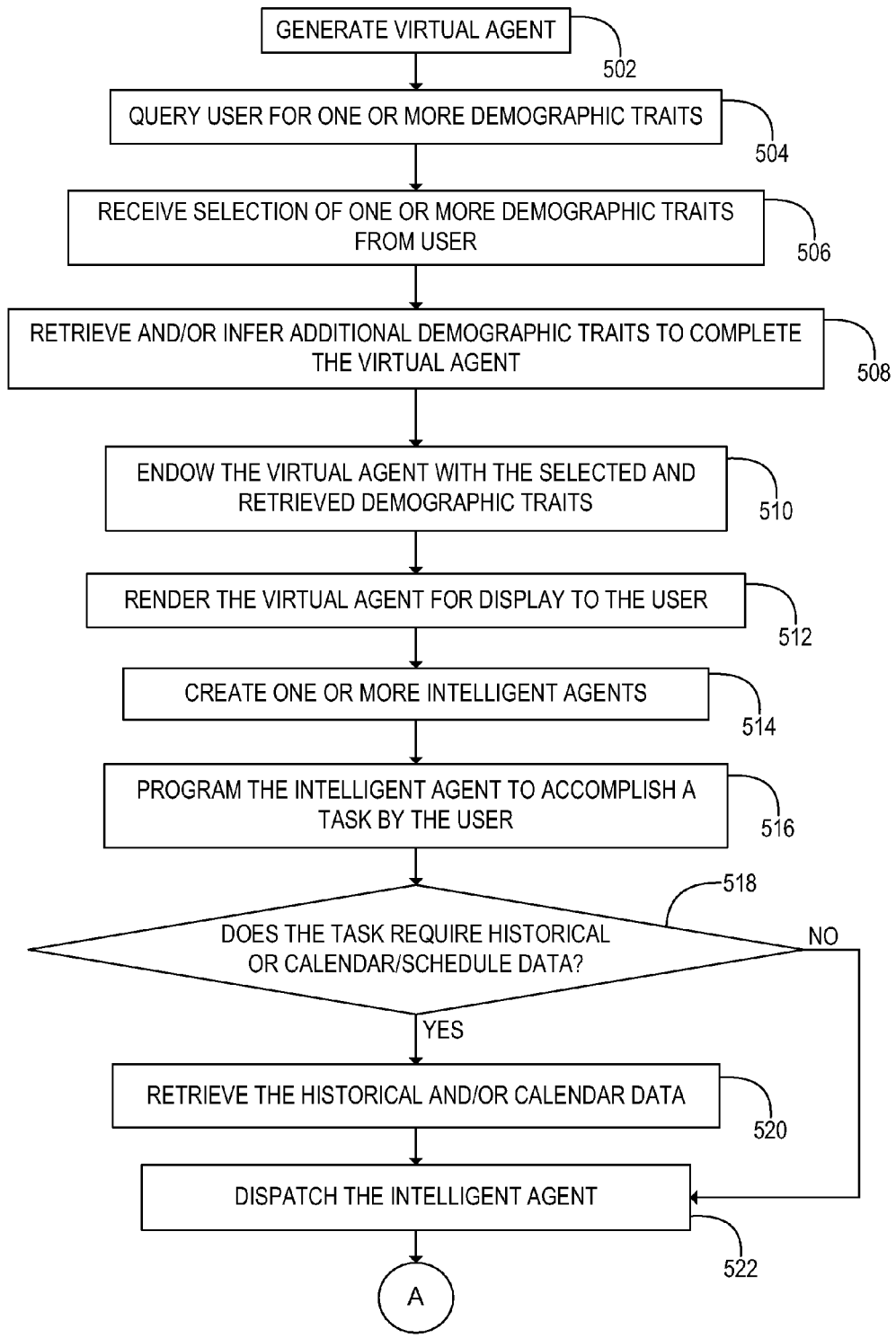
FIG. 10 is a flowchart illustrating a method of producing a virtual agent, according to the exemplary embodiments.

FIG. 10 depicts a flow diagram for creating a virtual agent within a user device as described above. At process 502, a virtual agent software object 36 is created within the user device 20 utilizing the client side host application 32. The creation may be accomplished, for example, using interactive menus (not shown) displayed on the GUI 37. Once the virtual agent 36 is created, the user may be queried by the application 32 to provide the desired character traits 40 to be displayed by the virtual agent at process 504. At step 506, the user may select of at least some of the character traits 40 that they would like the virtual agent 36 to display. The selection options presented to the user may be as detailed as is desired. As a non-limiting example the choices provided to the user may be few but may comprise a package of traits. As an alternative, a larger set of more detailed choices may allow the user to specify each characteristic individually At process 508, the client-side application 32 or the server-side application 22 may retrieve or infer additional characteristics to complete the virtual agent 36. As a non-limiting example, the user may have selected "Cowboy" as the façade of their virtual agent. The client side-application 32 and/or server-side application 26 may retrieve additional predefined anime characteristics from the trait database 52 as would be typical of a cowboy which may include a male human, hat, vest, boots, jeans, accent, cigarette, bow legs and a slow speech pattern with a dead pan sense of humor. The characteristics may be inferred, for example, from the geographic location of the user. After all, a Texas cowboy is completely different from a California rhinestone cowboy and a service provider would not wish to offend either one.

At process 510, the determined set of characteristics 40 are endowed upon the virtual agent 36. The virtual agent 36 is rendered upon the user device 20 via display device 38 at process 512. Depending upon the memory capacity of the user device 20 and the network capability, the virtual agent may reside on the central server 22, the user device 20 or another computing device in communication with the network 24 as may facilitate the rendition of the virtual agent 36 to the user. Further, software objects required for a quality rendition may be distributed among the user device 20, the central server 22, the trait server 120 or any other computing device in communication with the network 24.

At process 514, one or more intelligent agents 78 enable the virtual agent 36 to undertake one or more a tasks. As described above, the intelligent agent 78 may be any type of hardware or software module able to control intelligent or semi-intelligent web robots ranging from a simple web crawler/search engine to a sophisticated web robot that may engage in site scrapping or contract formation. The details concerning the creation and control of a web robot 200 is beyond the scope of this disclosure. However, the virtual agent 78 may manifest itself as a series of menus presented on the GUI 37, by accessing a web page or by verbal commands using the VRM 145.

Each Bot 200 may be stored in the web robot database 60 and executed by web robot server 140 via the intelligent agent 78. Alternatively, the Bot 200 may be stored elsewhere in the network 24 and merely indexed within web robot database 60 and or intelligent agent 78. Wherever located, the Bot 200 may be executed by the intelligent agent 78 which may be resident in web robot server 140, the central server 22 and/or the user device 20 as may fit the requirements of the system designer using the index within the web robot database 60.

At process 516 the Bot 200 is programmed to accomplish certain tasks as may be desired by the user. The Bot 200 may be directed via the intelligent agent 36 displayed in the GUI 37 by accessing a website as is widely practiced in the art. The user may use the VRM 145 to program the Bot 200. Such a programming via the VRM 145 may constitute a conversation or other verbal communication with the virtual agent 36. The tasking assignment 200-208 may be stored in the web robot database 60 or merely indexed there for access and execution elsewhere by the central server 22, the user device 20, the web robot server 140 or another computing device in communication with the network 24.

As a non-limiting example, the user may wish to purchase a model XYZ wrist watch for a birthday present by September 16. The user does not want to travel more than 5 miles to pick up the watch and, of course, wants the best price. The user may invoke their virtual agent 36 on their device 20. The virtual agent 36 may be invoked automatically upon powering up the user device 20 or may be invoked by manipulating a device control mechanism (not shown) commonly used in the art. The virtual agent 36 may verbally ask the user what the user wants to do. The user may tell their virtual agent to create a Bot 200 to search websites and return all pricing information for model XYZ watches being sold within 5 miles of the user's current geographic position. The user may also tell their virtual agent 36 to purchase a model XYZ watch with the above parameters if it locates a price below $150.00 but to cancel the search on September 17 in any event. The exchange of search parameters may occur as a series of specific questions and answers or questions and answers accompanied by a text input provided by the user. Although the user may be communicating with the virtual agent 36, the search requirements are being communicated to the intelligent agent 78 which, in turn, creates and controls Bot 200.

The client-side application 32 may compile the search request internally or transmit the search information to the central server 22. Because the Bot 200 may be sent on a prolonged search, it may be advantageous to have the central server 22 or other device on the network 24 to control the intelligent agent 78 as the central server 22 is likely to operate continually during the search. Once compiled, the search may be stored and/or indexed in the web robot database 60 and open a record associated to the search in the transaction database 56.

Once the Bot 200 has been created by the intelligent agent 78, the intelligent agent 78 decides if it needs calendar information to carry out its task at decision point 518. If so, the intelligent agent 78 may query the scheduling database 58 to establish the current date/time, the termination date/time, times to periodically report back to the user and/or schedule any other events that may be convenient or useful in the context of the task. Such data may be retrieved at process 520. At process 522, the intelligent agent is then dispatched.

Figure 11:
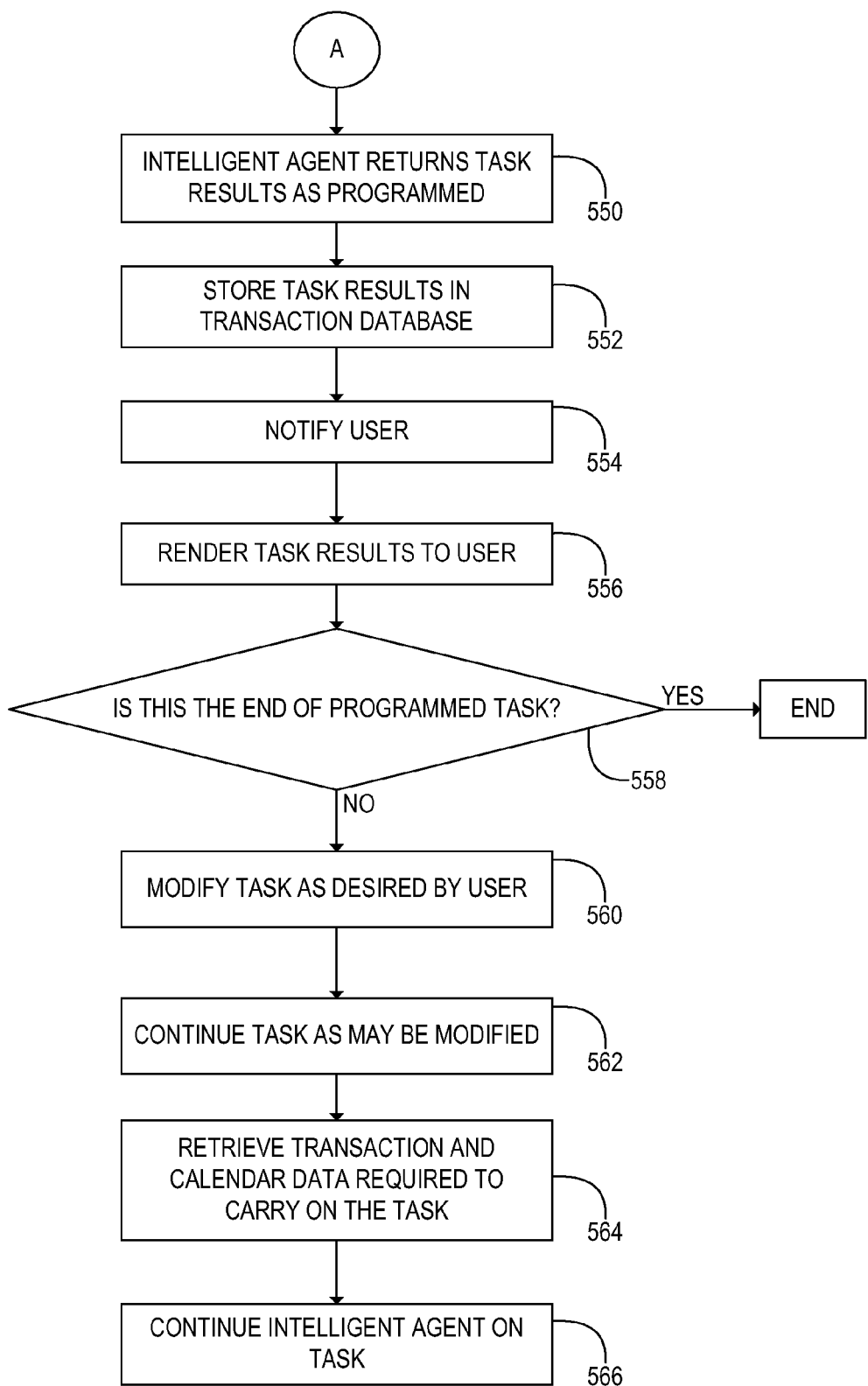
FIG. 11 is a flowchart illustrating the process of using an intelligent agent according to the exemplary embodiments.

FIG. 11 depicts a flow chart for processing task results obtained from a Bot 200 after it has been dispatched. As described, results from a Bot 200 may be returned almost immediately as in the case of a simple web search by a search engine or may be returned after a prolonged search or returned periodically. At process 550 the intelligent agent 78 returns its task results from the Bot 200. The task results are then stored in a database as desired by the system designer at process 552. As depicted in various embodiments herein the results are stored in the transaction database 56 as transaction information 92. The data structure may be any desired structure as may prove useful in a specific design situation. At Process 554 the user is notified that new search results are available. The new search results are rendered to the user at process 556. The notification may be by text, audible alert or tactile alert. In rendering the task results, it may be desired that the virtual agent 36 verbally and/or visually addresses the user when the user next accesses the user device 20. The virtual agent may inform the user of which search and/or Bot 200 is reporting back results and may provide a brief synopsis of the search results. As a non-limiting example the virtual agent may verbally state that it has found the tennis shoes that the user wanted for $41.50 from Bob's Shoes at 123 Main Street and then provide the phone number for Bob's.

If the task assigned to the particular Bot 200 is complete at decision point 558, then the routine ends. The task may be considered completed by satisfying one or more conditions as may be created by the user, dictated by the software making up the Bot 200 or by the user's service provider. The task may be considered complete after a specific period of time has elapsed, after the object of the Bot's 200 task has been located, found and/or retrieved, after a date/time specifically set by the user or any other task limitation that my prove to be useful to the system designer or to the user.

If the task is not complete at decision point 558, the task may be modified by the user at process 560. Of course, the task may be modified by the user at any time via a GUI, interaction with the virtual agent 36 or via web page. At process 560, it may be preferred that the intelligent agent specifically ask the user if they desire to alter the task. At process 562 the Bot 200 continues the prosecution of its programmed task. It should be noted that the Bot 200 does not have to stop its task just to report its results or its interim results to the intelligent agent 36 or to the user. The Bot 200 may continue its task regardless of an interaction between the user and the intelligent agent 36.

Based on the type of Bot 200 and its tasking, the intelligent agent 78 may need to periodically update its tasking. Over time the tasking of the intelligent agent 78 may be modified by the user, by prior task results 79 or by the passage of time. As such, the intelligent agent 78 may need to query the scheduling database for date/time information and/or the transaction database to refer back to prior search results or for new direction. Direction for the Bot 200 may then be updated.

As a non-limiting example, the intelligent agent may be tasked with a perpetual search for an antique sugar shaker shaped as a chicken to be purchased for no more than $600. The intelligent agent may have been looking for months. As such, the intelligent agent may need to refer back to previous search results in the transaction database 56 to determine if its newest find for $675, is the same as a find it made three months ago. As such, the intelligent agent 78 may query 94 the transaction database 56 to determine if the previous find was being offered by the same seller and the same address with the same telephone number using the same catalog number, etc. The intelligent agent 78 may need to determine the color of the previous find, or to determine other characteristic such as size, etc. Using the information from the transaction database 56, the intelligent agent 78 may be able to determine that the new find is a new unique find and a second occurrence of a previous find. The intelligent agent 78 may receive a response 106 that indicates that the last find was a green chicken sold at a different location.

Continuing the example, the intelligent agent 78 may also need to query the scheduling database 58 to determine when that last find was made, when it next needs to report and when to stop its search, for instance. As such the intelligent agent 78 may query 122 the scheduling database 58 at process 564 and receive a response 128 that the find of the green chicken occurred on March 15. The intelligent agent may also be programmed to query other data bases as well, for example the intelligent agent 78 may query 74 translation database 54 where it may translate the IP address 72 of its latest find of the green chicken to receiver a response 82 that may include a street, mailing address or telephone number. At process 566 the process ends and repeats.

The forgoing description is a non-limiting example for illustration only. The actual process may be highly contingent on the type of search being conducted and may contain additional steps or fewer steps. Steps may be combined or split into component sub-steps.

Exemplary embodiments may be physically embodied on or in a computer-readable medium. This computer-readable medium may include micro processors, CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-subscribers, licensees, and assignees. These types of computer-readable media, and other types not mention here but considered within the scope of the exemplary embodiments. A computer program product comprises processor-executable instructions for verifying identity.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method for producing a virtual agent within a computing device, comprising:
generating the virtual agent within the computing device, wherein the virtual agent includes a tactile feature and is accessible on a plurality of devices simultaneously;
endowing, by utilizing instructions from memory that are executed by a processor, the virtual agent with a first character trait of a user and a persona that is based on a personality of the user, wherein the first character trait is inferred without retrieving data associated with the first character trait of the user from the computing device;
endowing the virtual agent with a second character trait of the user, wherein the second character trait is selected based on a voice input of the user;
selecting, based on a location of the user, speech characteristics associated with the user, wherein the speech characteristics comprise an accent and a tone associated with the user;
endowing the virtual agent with the speech characteristics associated with the user;
visually presenting the virtual agent with the first character trait and the second character trait, wherein the virtual agent is visually presented using the persona of the user;

creating an intelligent agent; and
associating the virtual agent with the intelligent agent, the intelligent agent periodically accomplishing a task and reporting a corresponding task result to a user via the virtual agent.

2. The method of claim 1, wherein the task is communicated from the user to the intelligent agent via the virtual agent.

3. The method of claim 2, further comprising storing task result data within a database.

4. The method of claim 3, wherein the task result data is compatible for use by a personal navigation module.

5. The method of claim 2, wherein the task includes:
searching multiple websites across a computer network;
identifying information defined by the task within the computer network;
recognizing trends based on the identification;
presenting the trends to the user; and
storing the trends within a database as task result data.

6. The method of claim 2, wherein the user is presented a choice to communicate with the virtual agent by one of verbal communication and via a graphical user interface.

7. The method of claim 2, wherein the task is at least partially defined by reading scheduling data from a calendar module.

8. The method of claim 1, wherein the computing device is one of a personal communications device, a computer and an internet protocol capable television.

9. A computer readable medium containing instructions that when executed by a processor are operable to generate a virtual agent within a computing device, wherein the processor executes the instructions to perform operations comprising;
endowing the virtual agent with a first character trait of a user and a persona that is based on a personality of the user, wherein the first character trait is inferred without retrieving data associated with the first character trait of the user from the computing device, wherein the virtual agent includes a tactile feature and is accessible on a plurality of devices simultaneously;
endowing the virtual agent with a second character trait of the user, wherein the second character trait is selected based on a voice input of the user;
selecting, based on a location of the user, speech characteristics associated with the user, wherein the speech characteristics comprise an accent and a tone associated with the user;
endowing the virtual agent with the speech characteristics associated with the user;
visually presenting the virtual agent with the first character trait and the second character trait, wherein the virtual agent is presented using the persona of the user;
creating an intelligent agent; and
associating the virtual agent with the intelligent agent, the intelligent agent to accomplish a task outside the computing device, and to report a corresponding task result to, the user via the virtual agent.

10. The computer readable medium of claim 9, wherein the operations further comprise programming the intelligent agent to create a web robot.

11. The computer readable medium of claim 10, wherein the operations further comprise storing task result data within a database.

12. The computer readable medium of claim 11, wherein the task result data is compatible for use by a personal navigation module.

13. The computer readable medium of claim 10, wherein the task includes:
searching a computer network;
identifying information within the computer network defined by the task;
recognizing trends based on the identification;
presenting the trends to the user; and
storing the trends within a database as task result data.

14. The computer readable medium of claim 10, wherein the report of a task result is periodically provided to a user via the virtual agent.

15. The method of claim 10, wherein the task is at least partially defined by reading scheduling data from a calendar module.

16. The method of claim 9, wherein the computing device is of a personal communications device, a computer and an internet protocol capable television.

17. A system for implementing a virtual agent for a user within a computing device, comprising:
a memory that stores instructions;
a processor that creates the virtual agent, wherein the processor executes the instructions to perform operations, the operations comprising:
endowing the virtual agent with a first character trait of the user and a persona that is based on a personality of the user, wherein the first character trait is inferred without retrieving data associated with the first character trait of the user from the computing device, wherein the virtual agent includes a tactile feature and is accessible on a plurality of devices simultaneously;
endowing the virtual agent with a second character trait of the user, wherein the second character trait is selected based on a voice input of the user;
selecting, based on a location of the user, speech characteristics associated with the user, wherein the speech characteristics comprise an accent and a tone associated with the user;
endowing the virtual agent with the speech characteristics associated with the user;
rendering the virtual agent to the user via a user interface, wherein the virtual agent is presented using the persona of the user; and
communicating between the virtual agent and the user; and
a database, wherein the computing device, the processor and the database are in communication with each other via a network.

18. The system of claim 17, wherein the operations further comprise a plurality of intelligent agents.

19. The system of claim 17, further a comprising a central server in communication with the computing device and the database via the network, the central server supporting operation of a plurality of intelligent agents created and controlled by the computing device.

20. The system of claim 17, wherein the operations further comprise accessing scheduling data from a calendar module.

* * * * *